United States Patent [19]

Krutak et al.

[11] 4,385,104

[45] May 24, 1983

[54] PHOTOGRAPHIC PRODUCTS AND PROCESSES EMPLOYING NOVEL NONDIFFUSIBLE 6-(2-THIENYLAZO)-3-PYRIDINOL CYAN DYE-RELEASING COMPOUNDS AND PRECURSORS THEREOF

[75] Inventors: James J. Krutak; Robert J. Maleski; William H. Moore, all of Kingsport, Tenn.

[73] Assignee: Eastman Kodak Company, Rochester, N.Y.

[21] Appl. No.: 348,381

[22] Filed: Feb. 12, 1982

Related U.S. Application Data

[62] Division of Ser. No. 258,845, Apr. 29, 1981, Pat. No. 4,346,161.

[51] Int. Cl.$^3$ .......................... G03C 1/40; C09B 45/00

[52] U.S. Cl. .................................. 430/17; 260/146 R

[58] Field of Search ............. 260/146 R; 430/17, 223, 430/222, 225, 226, 562, 519

[56] References Cited

U.S. PATENT DOCUMENTS

| | | | |
|---|---|---|---|
| 4,142,891 | 3/1979 | Baigrie et al. | 430/223 |
| 4,195,944 | 4/1980 | Chapman | 430/223 |
| 4,287,292 | 9/1981 | Chapman et al. | 430/223 |

FOREIGN PATENT DOCUMENTS

| | | |
|---|---|---|
| 2304203 | 8/1973 | Fed. Rep. of Germany . |
| 580668 | 8/1976 | Switzerland . |

*Primary Examiner*—Richard L. Schilling
*Attorney, Agent, or Firm*—Harold E. Cole

[57] ABSTRACT

Photographic elements, diffusion transfer assemblages and processes are described which employ a novel non-diffusible compound having a releasable 6-(2-thienylazo)-3-pyridinol cyan dye moiety or precursor thereof, the compound containing:

(a) in the 3-position of the thienylazo moiety a carboxy group, a salt thereof or a hydrolyzable precursor thereof; and (b) a ballasted carrier moiety which is capable of releasing the diffusible 6-(2-thienylazo)-3-pyridinol dye moiety or precursor thereof under alkaline conditions.

6 Claims, No Drawings

PHOTOGRAPHIC PRODUCTS AND PROCESSES EMPLOYING NOVEL NONDIFFUSIBLE 6-(2-THIENYLAZO)-3-PYRIDINOL CYAN DYE-RELEASING COMPOUNDS AND PRECURSORS THEREOF

This is a division of application Ser. No. 258,845, filed Apr. 29, 1981, now U.S. Pat. No. 4,346,161.

This invention relates to photography and more particularly to color diffusion transfer photography employing certain nondiffusible azo dye-releasing compounds which, as a function of development of a silver halide emulsion layer, release a diffusible metallizable, 6-(2-thienylazo)-3-pyridinol cyan dye or precursor thereof. Highly stable metal complexes of this dye are formed in an image-receiving layer.

U.S. patent application Ser. No. 174,406 of Chapman and Reczek, filed Aug. 1, 1980, now U.S. Pat. No. 4,287,292, issued Sept. 1, 1981, relates to 6-arylazo-3-pyridinol dye-releasing compounds which are magenta. The compounds of our invention, however, have a thienyl nucleus instead of a phenyl nucleus, and are cyan instead of magneta.

U.S. Pat. No. 4,142,891 of Baigrie et al relates to various nondiffusible azo dye-releasing compounds, including compounds having a releasable 6-arylazo-3-pyridinol dye moiety, as shown in column 5, lines 1 through 25 and Compounds 11 and 12. U.S. Pat. No. 4,195,994 of Chapman also relates to 6-arylazo-2-amino-3-pyridinol dye-releasing compounds. Cyan compounds in both of those patents are said to be obtained when the phenyl nucleus of those compounds has a nitro group para to the azo linkage. The compounds of our invention, however, have a thienyl nucleus instead of a phenyl nucleus, and do not have a nitro group. Not having a nitro group on the compound is an advantage, since a nitro group is susceptible to reduction in the presence of reducing agents such as alkylhydroquinones under some high pH conditions. In addition, the cyan dyes in accordance with our invention have excellent hues and less unwanted absorption below 600 nm than the closest analogues of the Baigrie et al and Chapman et al patent application, as will be illustrated by the comparative tests shown hereinafter.

German OLS No. 2,304,203 discloses textile dyes having a thienylazo moiety attached to a 2,6-dihydroxypyridine ring. Swiss Pat. No. 580,668 also discloses a thienylazo moiety attached to a pyridine ring. In both of those references, however, the nitrogen in the pyridine ring is not in a chelating position with respect to the ortho position of the thienylazo moiety, as in our invention. In addition, there is no disclosure in those references that those compounds could be attached to carriers and used in photograghic elements.

It would be desirable to provide improved cyan dye-releasing compounds containing chelating dye moieties, so that the dye which is released imagewise during processing can diffuse to an image-receiving layer containing metal ions to form a metal-complexed, dye transfer image having better hues, less unwanted absorption, narrower bandwidths, rapid diffusion rates and shorter access times than those of the prior art, as well as good stability to heat, light and chemical reagents.

A photographic element in accordance with the invention comprises a support having thereon at least one photosensitive silver halide emulsion layer, said emulsion layer having associated therewith a dye image-providing material comprising a nondiffusible compound having at least one diffusible 6-(2-thienylazo)-3-pyridinol dye moiety or precursor thereof, said compound containing:

(a) in the 3-position of the thienylazo moiety a carboxy group, a salt thereof (such as the sodium, potassium or ammonium salt) or a hydrolyzable precursor thereof; and (b) a ballasted carrier moiety which is capable of releasing the diffusible azo dye under alkaline conditions.

In a preferred embodiment of our invention, our nondiffusible compounds are defined by the following formula:

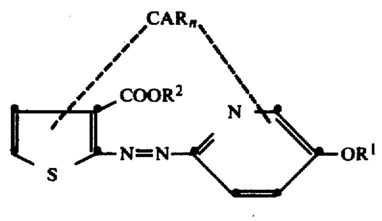

wherein:

(a) $R^1$ is hydrogen, a hydrolyzable moiety or CAR;

(b) $R^2$ is hydrogen, an alkyl, substituted alkyl, aryl or substituted aryl, such that $COOR^2$ is a hydrolyzable moiety; for example, $R^2$ may be an alkyl or substituted alkyl group having from 1 to about 10 carbon atoms, such as methyl, ethyl, t-butyl, or cyanoethyl; or an aryl or substituted aryl group having from 6 to about 10 carbon atoms, such as phenyl, p-nitrophenyl or chlorophenyl;

(c) CAR is a ballasted carrier moiety capable of releasing the diffusible 6-(2-thienylazo)-3-pyridinol dye moiety or precursor thereof as a function of development of the silver halide emulsion layer under alkaline conditions; and (d) n is 0, 1 or 2, with the proviso that when n is 0, then $R^1$ is CAR.

Other substituents may also be present in the two rings illustrated above, such as alkyl of 1 to 6 carbon atoms, acyl, aryl of 6 to 10 carbon atoms, aralkyl, alkylsulfonyl, amino, alkoxy, halogens, phenylsulfamoyl, solubilizing groups such as sulfonamido, sulfamoyl, carboxy, sulfo or hydrolyzable precursors thereof.

In another preferred embodiment of our invention, $R^2$ is hydrogen, cyanoethyl or phthalimidomethyl. In still another preferred embodiment of our invention, $R^1$ is hydrogen, $R^2$ is hydrogen and the pyridine ring has an amino group in the 2-position. In yet another preferred embodiment of our invention, the thienyl ring has in the 5-position an $R^3CO$ group, wherein $R^3$ is an alkyl or substituted alkyl group having from 1 to about 10 carbon atoms, such as methyl, ethyl, t-butyl or isopropyl; or an aryl or substituted aryl group having from 6 to about 10 carbon atoms, such as phenyl, m-sulfamoylphenyl, m-hydroxyphenyl or p-chlorophenyl.

In another embodiment of the invention, CAR may have attached thereto two azo dye moieties, as shown by the formula above, in which case two dye moieties will be released from one CAR moiety.

When $R^1$ is CAR or a hydrolyzable moiety, the absorption of the dye-releasing compound is shifted out of the red region of the spectrum, so that the compound may be incorporated in the emulsion layer, which is very desirable in certain embodiments of the invention.

As stated above, $R^1$ represents hydrogen, a hydrolyzable moiety or CAR. Hydrolyzable moieties which can be employed in our invention include acetate, benzoate, pivalate, carbamates, or any of the blocking groups disclosed in Reczek and Welter U.S. application Ser. No. 220,408, filed Dec. 29, 1980, or any of the blocking groups which can be cleaved by an intramolecular nucleophilic displacement reaction, as disclosed in Mooberry and Archie U.S. Ser. No. 949,462, filed Oct. 10, 1978, now U.S. Pat. No. 4,310,612, issued Jan. 12, 1982, the disclosures of which are hereby incorporated by reference.

There is great latitude in selecting a CAR moiety which is attached to the dye-releasing compounds described above. Depending upon the nature of the ballasted carrier selected, various groups may be needed to attach or link the carrier moiety to the dye. Such linking groups are considered to be a part of the CAR moiety in the above definition. It should also be noted that, when the dye moiety is released from the compound, cleavage may take place in such a position that part or all of the linking group, if one is present, and even part of the ballasted moiety, may be transferred to the image-receiving layer, along with the dye moiety. In any event, the dye nucleus as shown above can be thought of as the minimum which is transferred.

CAR moieties useful in the invention are described in U.S. Pat. Nos. 3,227,550; 3,628,952; 3,227,552 and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); British Patent Publication No. 2,017,950A (dye released by a dye bleach process); U.S. Pat. Nos. 4,053,312; 4,198,235; 4,179,231; 4,055,428 and 4,149,892 (dye released by oxidation and deamidation); and U.S. Pat. Nos. 3,245,789 and 3,980,497; Canadian Pat. No. 602,607; British Pat. No. 1,464,104; *Research Disclosure* 14447, April 1976; U.S. Pat. No. 4,139,379 of Chasman et al, U.S. Pat. No. 4,232,107 and European Patent Publication No. 12908 (dye released by miscellaneous mechanisms), the disclosures of which are hereby incorporated by reference.

In a further preferred embodiment of the invention, the ballasted carrier moiety or CAR as described above may be represented by the following formula:

(Ballast—Carrier—Link)— wherein:

(a) Ballast is an organic ballasting radical of such molecular size and configuration as to render said compound nondiffusible in said photographic element during development in an alkaline processing composition;

(b) Carrier is an oxidizable acyclic, carbocyclic or heterocyclic moiety (see "*The Theory of the Photographic Process*", by C. E. K. Mees and T. H. James, Third Edition, 1966, pages 282 to 283), e.g., moieties containing atoms according to the following configuration:

$a(—C=C)_b—$ wherein:

b is a positive integer of 1 to 2; and a represents the radicals OH, SH, NH— or hydrolyzable precursors thereof; and (c) Link represents a group which, upon oxidation of said Carrier moiety, is capable of being hydrolytically cleaved to release the diffusible azo dye. For example, Link may be the following groups:

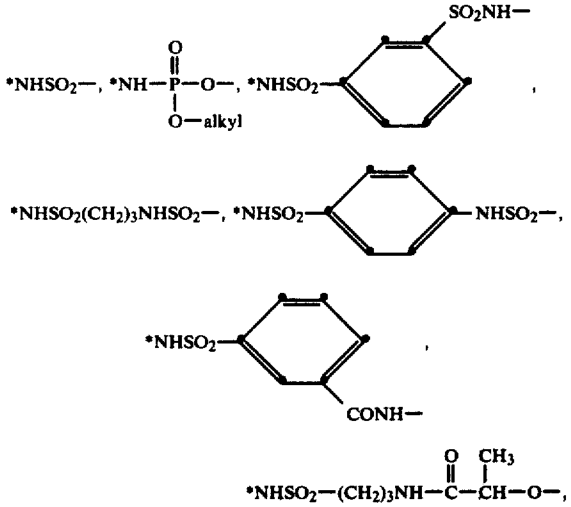

wherein * represents the position of attachment to Carrier.

The Ballast group in the above formula is not critical, so long as it confers nondiffusibility to the compound. Typical Ballast groups include long-chain alkyl radicals, as well as aromatic radicals of the benzene and naphthalene series linked to the compound. Useful Ballast groups generally have at least 8 carbon compounds, such as substituted or unsubstituted alkyl groups of 8 to 22 carbon atoms; a carbamoyl radical having 8 to 30 carbon atoms, such as $—CONH(CH_2)_4—O—C_6H_3(C_5H_{11})_2$, or $—CON(C_{12}H_{25})_2$; or a keto radical having 8 to 30 carbon atoms, such as $—CO-C_{17}H_{35}$ or $—CO-C_6H_4(t-C_{12}H_{25})$.

For specific examples of Ballast-Carrier moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formula is a group having the formula:

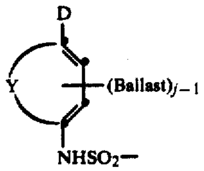

wherein:

(a) Ballast is an organic ballasting radical of such molecular size and configuration (e.g., simple organic groups or polymeric groups) as to render said compound nondiffusible in a photographic element during development in an alkaline processing composition;

(b) D is $OR^4$ or $NHR^5$ wherein $R^4$ is hydrogen or a hydrolyzable moiety, such as acetyl, mono-, di- or trichloroacetyl radicals, perfluoroacyl, pyruvyl, alkoxyacyl, nitrobenozyl, cyanobenzoyl, sulfonyl or sulfinyl, and $R^5$ is hydrogen or a substituted or unsubstituted alkyl group of 1 to 22 carbon atoms, such as methyl, ethyl, hydroxyethyl, propyl, butyl, secondary butyl, tertbutyl, cyclopropyl, 4-chlorobutyl, cyclobutyl, 4-nitroamyl, hexyl, cyclohexyl, octyl, decyl, octadecyl, dodecyl, benzyl or phenethyl (when $R^5$ is an alkyl group of greater than 8 carbon atoms, it can serve as a partial or sole Ballast);

(c) Y represents at least the atoms necessary to complete a benzene nucleus, a naphthalene nucleus, or a 5 to 7 membered heterocyclic ring, such as pyrazolone or pyridimine; and (d) j is a positive integer of 1 to 2 and is 2 when D is $OR^4$ or when $R^5$ is hydrogen or an alkyl group of less than 8 carbon atoms.

Especially good results are obtained in the above formula when D is OH, j is 2, and Y is a naphthalene nucleus.

Examples of the CAR moiety in this highly preferred embodiment are disclosed in U.S. Pat. Nos. 4,076,529; 3,993,638 and 3,928,312, the disclosures of which are hereby incorporated by reference, and include the following:

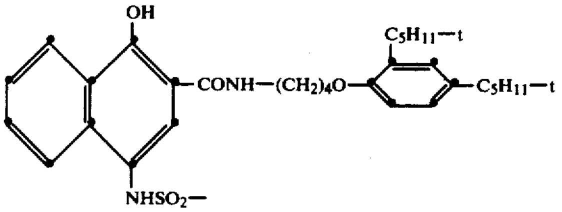

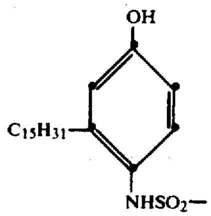

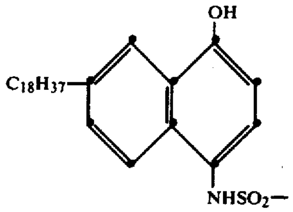

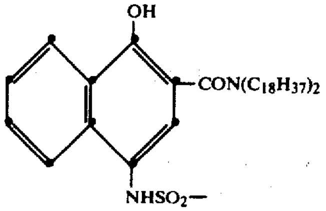

-continued

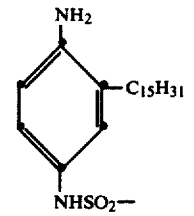

In another highly preferred embodiment of the invention, the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

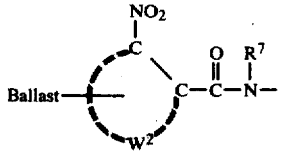

(I)

wherein:

Ballast is an organic ballasting radical of such molecular size and configuration as to render said compound nondiffusible in a photographic element during development in an alkaline processing composition;

$W^2$ represents at least the atoms necessary to complete a benzene nucleus (including various substituents thereon); and $R^7$ is an alkyl (including substituted alkyl) radical having 1 to about 4 carbon atoms.

Examples of the CAR moiety in this formula (I) include the following:

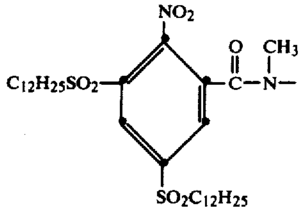

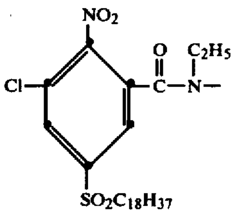

In a second embodiment of positive-working dye-release chemistry as referred to above, the ballasted carrier moiety or CAR in the above formulas may be a group having the formula:

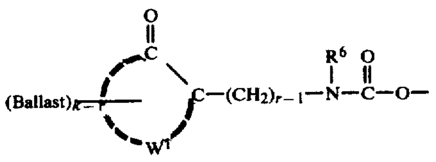

(II)

wherein:

- Ballast is an organic ballasting radical of such molecular size and configuration as to render said compound nondiffusible in a photographic element during development in an alkaline processing composition;
- $W^1$ represents at least the atoms necessary to complete a quinone nucleus (including various substituents thereon);
- r is a positive integer of 1 or 2;
- $R^6$ is an alkyl (including substituted alkyl) radical having 1 to about 40 carbon atoms or an aryl (including substituted aryl) radical having 6 to about 40 carbon atoms; amnd
- k is a positive integer of 1 to 2 and is 2 when $R^6$ is a radical of less than 8 carbon atoms.

Examples of the CAR moiety in this formula (II) include the following:

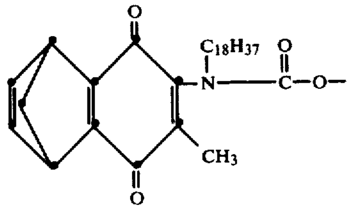

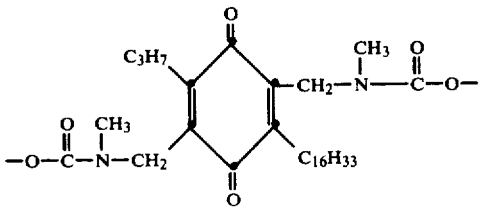

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 of Chasman et al, the disclosure of which is hereby incorporated by reference.

In a third embodiment of positive-working dye-release chemistry as referred to above, the ballasted carrier moiety or CAR in the above formulas may be a group having the formula:

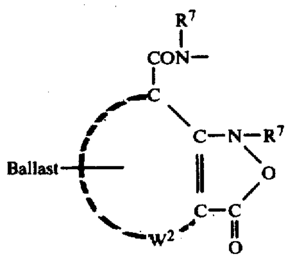

(III)

wherein:

Ballast, $W^2$ and $R^7$ are as defined for formula (I) above.

Examples of the CAR moiety in this formula (III) include the following:

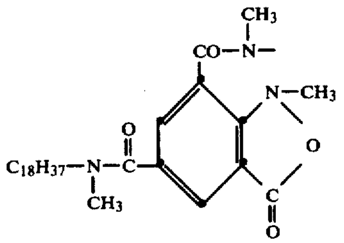

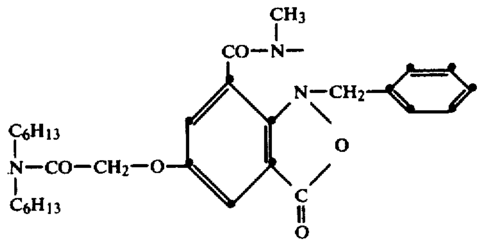

For further details concerning this particular CAR moiety, including synthesis details, reference is made to U.S. Pat. No. 4,199,354 of Hinshaw et al, the disclosure of which is hereby incorporated by reference.

In a fourth embodiment of positive-working dye-release chemistry as referred to above, the ballasted carrier moiety or CAR in the above formulas may be a group having the formula:

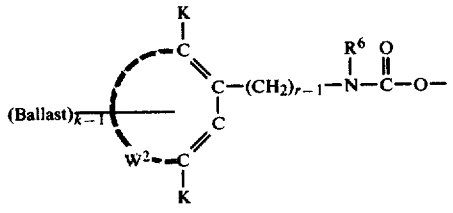

(IV)

wherein:

- Ballast, r, $R^6$ and k are as defined for formula (II) above;
- $W^2$ is as defined for formula (I) above; and K is OH or a hydrolyzable precursor thereof.

Examples of the CAR moiety in this formula (IV) include the following:

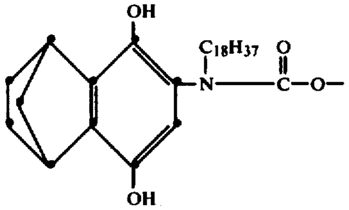
-continued
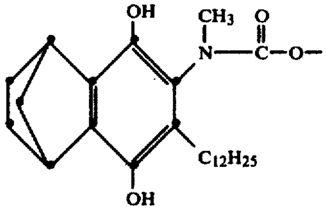
For further details concerning this particular CAR moiety, including synthesis details, reference is made to U.S. Pat. No. 3,980,479 of Fields et al, the disclosure of which is hereby incorporated by reference.
Representative compounds included within the scope of the invention include the following:
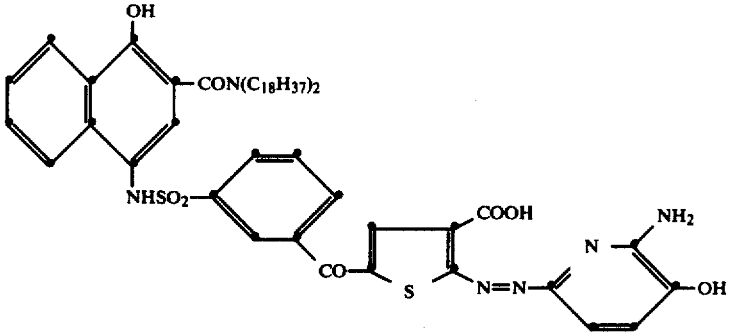
(1)
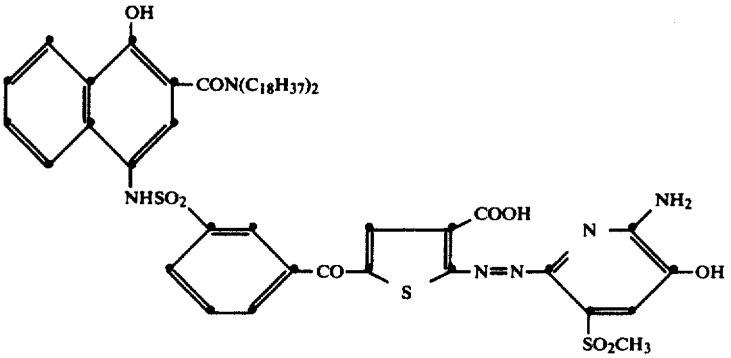
(2)
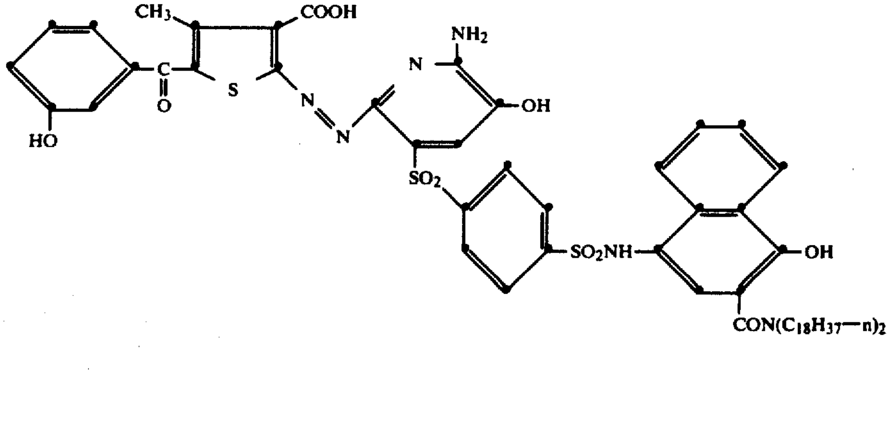
(3)

TABLE I

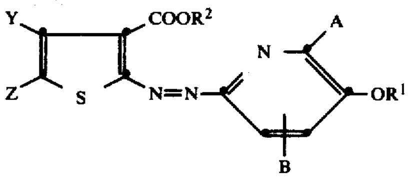

| Compound | $R^2$ | Y | Z | A | B | $R^1$ |
|---|---|---|---|---|---|---|
| 4 | H | H | $C_6H_5$— | $NH_2$ | 5-$SO_2$—m-$C_6H_4OQ^1$ | $W^1$ |
| 5 | H | H | i-$C_3H_7CO$— | $NH_2$ | 5-$SO_2CH_3$ | $Q^1$ |
| 6 | H | $CH_3$ | $Q^1$—O—m-$C_6H_4CO$— | $NH_2$ | 5-$SO_2CH_3$ | $W^1$ |
| 7 | $W^7$ | H | $Q^1$—O—m-$C_6H_4CO$— | $NH_2$ | 5-$SO_2NHC_3H_7$—i- | $W^1$ |
| 8 | $W^6$ | H | $Q^1$—O—m-$C_6H_4CO$— | $NH_2$ | 5-$SO_2NHC_3H_7$—i | $W^1$ |
| 9 | $W^7$ | H | $Q^2$—O—m-$C_6H_4CO$— | $NH_2$ | 5-$SO_2NHC_3H_7$—i | $W^1$ |
| 10 | $W^7$ | H | $Q^2$—O—m-$C_6H_4CO$ | $NH_2$ | 5-$SO_2NHC_3H_7$—i | $W^2$ |
| 11 | H | H | $Q^1$—O—m-$C_6H_4CO$ | $NH_2$ | 5-$SO_2NHC_3H_7$—i | $W^1$ |
| 12 | H | H | $Q^1$—O—m-$C_6H_4CO$ | $NH_2$ | 5-$SO_2NHC_3H_7$—i | $W^1$ |
| 13 | H | H | $Q^1$—O—m-$C_6H_4CO$ | $NH_2$ | 5-$SO_2NHC_3H_7$—i | $W^2$ |
| 14 | $W^7$ | H | $Q^2$—O—m-$C_6H_4CO$— | $NH_2$ | 5-$SO_2NHC_3H_7$—i | $W^3$ |
| 15 | $\overset{+}{N}(C_4H_9—n)_4$ | H | $Q^1$—O—m-$C_6H_4CO$— | $NH_2$ | 5-$SO_2NHC_3H_7$—i | $W^4$ |
| 16 | H | H | $Q^1$—O—m-$C_6H_4CO$— | $NH_2$ | 5-$SO_2NHC_3H_7$—i | $W^3$ |
| 17 | $W^7$ | H | $Q^2$—O—m-$C_6H_4CO$— | $NH_2$ | 5-$SO_2N(CH_3)_2$ | $W^1$ |
| 18 | H | H | $Q^2$—O—m-$C_6H_4CO$— | $NH_2$ | 5-$SO_2N(CH_3)_2$ | $W^1$ |
| 19 | $W^7$ | H | $Q^2$—O—m-$C_6H_4CO$— | $NH_2$ | 5-$SO_2NHC_3H_7$—i | $W^1$ |
| 20 | H | H | $Q^1$—O—m-$C_6H_4CO$— | $NH_2$ | 5-$SO_2CH_3$ | $W^1$ |
| 21 | $W^7$ | H | $Q^1$—O—m-$C_6H_4CO$— | OH | 5-$SO_2C_6H_5$ | i-$C_4H_9OCO$— |
| 22 | $W^7$ | H | $Q^2$—O—m-$C_6H_4CO$— | $NH_2$ | 5-$SO_2CH_3$ | $W^1$ |
| 23 | $W^7$ | H | $Q^1$—O—m-$C_6H_4CO$— | $NH_2$ | 5-$SO_2CH_3$ | $W^1$ |
| 24 | $W^7$ | H | $Q^3$—O—m-$C_6H_4CO$— | $NH_2$ | 5-$SO_2NHC_3H_7$—i | $W^1$ |
| 25 | $\overset{+}{N}(C_4H_9—n)_4$ | H | $Q^1$—O—m-$C_6H_4CO$— | $NH_2$ | 5-$SO_2NHC_3H_7$—i | $W^5$ |
| 26 | H | H | $C_6H_5CO$— | $NH_2$ | 5-$SO_2$—m-$C_6H_4$—$OQ^1$ | $W^5$ |

BLOCKING GROUPS $W^1$ =

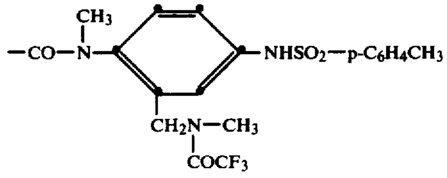

$W^2$ =

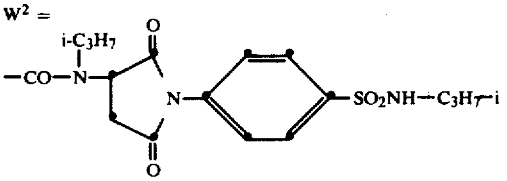

$W^3$ =

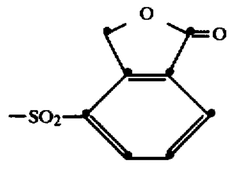

$W^4$ =

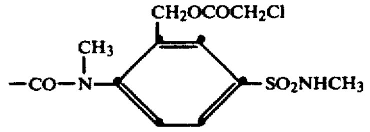

-continued

BLOCKING GROUPS $W^5$ =

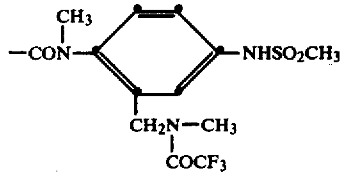

$W^6$ =

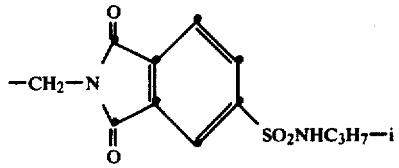

$W^7$ =

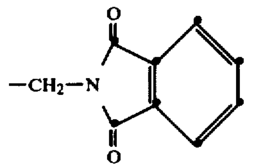

Blocking groups $W^1$ through $W^5$ are the subject of Mooberry and Archie U.S. Ser. No. 949,462, filed Oct. 10, 1978, now U.S. Pat. No. 4,310,612 issued Jan. 12, 1982. These blocking groups are used to shift the dye out of the visible range for coating in a red-sensitive silver halide emulsion layer. Blocking groups $W^6$ and $W^7$ are the subject of Reczek and Welter U.S. Ser. No. 240,348, filed Mar. 4, 1981, entitled "Photographic Dyes and Dye-Releasing Compounds".

QUINONE IMAGING CARRIERS (Since the following carriers are divalent, two of the dye moieties illustrated in Table I are attached thereto.)

$Q^1$ =

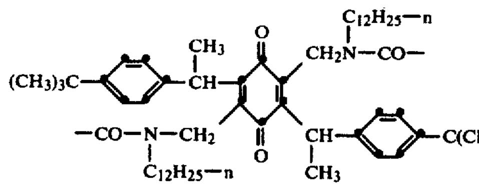

$Q^2$ =

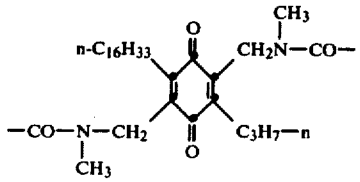

$Q^3$ =

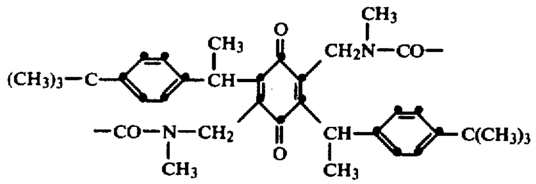

A process for producing a photographic transfer image in color according to the invention comprises:

(a) treating an imagewise-exposed photographic element as described above with an alkaline processing composition in the presence of a silver halide developing agent to effect development of each of the exposed silver halide emulsion layers;

(b) the dye-releasing compound then releasing the diffusible azo dye as described above imagewise as a function of the development of each of the silver halide emulsion layers;

(c) at least a portion of the imagewise distribution of the azo dye diffusing to a dye image-receiving layer; and (d) contacting the imagewise distribution of azo dye with metal ions, thereby forming a metal-complexed azo dye transfer image.

The tridentate azo dye ligand which is released from the dye-releasing compounds in accordance with the present invention will form a coordination complex in the image-receiving layer with polyvalent metal ions. The metal ions can be present in the image-receiving layer itself or in a layer adjacent thereto, or the image-receiving layer can be contacted with metal ions in a bath after diffusion of the dye has taken place. Metal ions most useful in the invention are those which are essentially colorless when incorporated into the image-receiving element, are inert with respect to the silver halide layers, react readily with the released dye to form a complex of the desired hue, are tightly coordinated to the dye in the complex, have a stable oxidation state, and form a dye complex which is stable to heat, light and chemical reagents. In general, good results are obtained with polyvalent metal ions such as copper (II), zinc (II), nickel (II), platinum (II), palladium (II) and cobalt (II) ions.

For example, it is believed that the coordination complex which is formed from the tridentate azo dye ligand according to the invention in one of the preferred embodiments thereof has the following structure:

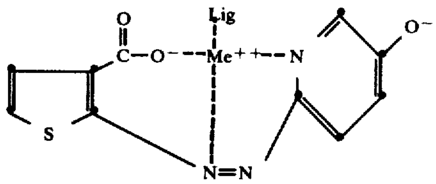

wherein:

Me is metal; and

Lig is one or more ligand groups, depending upon the coordination number of the metal ion, such as $H_2O$, Cl or pyridine, a second dye moiety or a part of a polymer.

Thus, in accordance with this preferred embodiment of the invention, a photographic element is provided which comprises a support having thereon a coordination complex of a polyvalent metal ion and a compound having the formula:

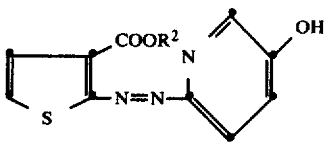

wherein:

$R^2$ is as described previously.

The element usually contains a photographic mordant or image-receiving layer to bind the dye or coordination complex thereto.

The structures shown above may also, of course, be substituted in the same manner as described above for the starting compounds from which they are released.

It will be appreciated that, after processing the photographic element described above, there remains in it after transfer has taken place an imagewise distribution of azo dye in addition to developed silver. A color image comprising residual nondiffusible compound is obtained in this element if the residual silver and silver halide are removed by any conventional manner well known to those skilled in the photographic art, such as a bleach bath, followed by a fix bath, a bleach-fix bath, etc. Such a retained dye image should normally be treated with metal ions to metallize the dyes to increase their light fastness and shift their spectral absorption to the intended region. The imagewise distribution of azo dye may also diffuse out of the element into these baths, if desired, rather than to an image-receiving element. If a negative-working silver halide emulsion is employed in certain preferred photosensitive elements, described above, then a positive color image, such as a reflection print, a color transparency or motion picture film, is produced in this manner. If a direct-positive silver halide emulsion is employed in such photosensitive elements, then a negative color image is produced.

The photographic element in the above-described process is treated in any manner with an alkaline processing composition to effect or initiate development. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit or assemblage in accordance with this invention is adapted to be processed by an alkaline processing composition, and comprises:

(1) a photographic element as described above; and (2) a dye image-receiving layer.

In this embodiment, the processing composition may be inserted into the film unit, such as by interjecting processing solution with communicating members similar to hypodermic syringes which are attached either to a camera or camera cartridge. The processing composition can also be applied by means of a swab or by dipping in a bath, if so desired. Another method of applying processing composition in a film assemblage which can be used in our invention is the liquid spreading means described in U.S. application Ser. No. 143,230 of Columbus, filed Apr. 24, 1980.

In a preferred embodiment of the invention, the assemblage itself contains the alkaline processing composition and means containing same for discharge within the film unit. There can be employed, for example, a rupturable container which is adapted to be positioned during processing of the film unit so that a compressive force applied to the container by pressure-applying members, such as would be found in a camera designed for in-camera processing, will effect a discharge of the container's contents within the film unit.

In the embodiment described above, the dye image-receiving layer may itself contain metal ions or the metal ions may be present in an adjacent layer, so that the tridentate azo dye ligand which is released will form a coordination complex therewith. The dye thus becomes immobilized in the dye image-receiving layer and metallized at the same time. Alternatively, the dye image in the dye image-receiving layer may be treated with a solution containing metal ions to effect metallization. The formation of the coordination complex shifts the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

The dye image-receiving layer in the above-described film assemblage is optionally located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the above-described film assemblage in another embodiment is located integrally with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is useful is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide emulsion layer. The film unit contains a silver halide solvent, preferably in a rupturable container with the alkaline processing composition.

The film unit or assembly used in the present invention is used to produce positive images in single- or multicolors. In a three-color system, each silver halide emulsion layer of the film assembly will have associated therewith a dye-releasing compound which releases a dye possessing a predominant spectral absorption within the region of the visible spectrum to which said silver halide emulsion is sensitive (initially or after forming the coordination complex), i.e., the blue-sensitive silver halide emulsion layer will have a yellow or yellow-forming dye-releaser associated therewith, the green-sensitive silver halide emulsion layer will have the magenta or magenta-forming dye-releaser of the invention associated therewith, and the red-sensitive silver halide emulsion layer will have a cyan or cyan-forming dye-releaser associated therewith. The dye-releaser associated with each silver halide emulsion layer is contained either in the silver halide emulsion layer itself or in a layer contiguous to the silver halide emulsion layer.

The concentration of the dye-releasing compounds that are employed in the present invention may be varied over a wide range, depending upon the particular compound employed and the results which are desired. For example, the dye-releasers of the present invention may be coated in layers by using coating solutions containing between about 0.5 and about 8 percent by weight of the dye-releaser distributed in a hydrophilic film-forming natural material or synthetic polymer, such as gelatin, polyvinyl alcohol, etc, which is adapted to be permeated by aqueous alkaline processing composition.

Depending upon which CAR is used in the present invention, a variety of silver halide developing agents or electron transfer agents (ETA's) are useful in this invention. In certain embodiments of the invention, any ETA can be employed as long as it cross-oxidizes with the dye-releasers described herein. The ETA may also be incorporated in the photosensitive element to be activated by the alkaline processing composition. Specific examples of ETA's useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol or 4-(N-octadecylamino)-catechol; and phenylenediamine compounds, such as N,N,-N',N'-tetramethyl-p-phenylenediamine. In highly preferred embodiments, the ETA is a 3-pyrazolidinone compound, such as 1-phenyl-3-pyrazolidinone (Phenidone), 1-phenyl-4,4-dimethyl-3-pyrazolidinone (Dimezone), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4-dimethylphenyl)-3-pyrazolidinone, 1-m-tolyl-3-pyrazolidinone, 1-p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrazolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In a preferred embodiment of the invention, the silver halide developer or ETA employed in the process becomes oxidized upon development and reduces silver halide to silver metal. The oxidized developer than cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its selfdiffusivity or by its having attached to it one or more solubilizing groups, for example, a carboxy, sulpho, sulphonamido, hydroxy or morpholino group.

In using the dye-releasing compounds according to the invention which produce diffusible dye images as a function of development, either conventional negative-working or direct-positive silver halide emulsions are employed. If the silver halide emulsion employed is a direct-positive silver halide emulsion, such as an internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After being contacted by the alkaline processing composition, a neutralizing layer in the film unit or image-receiving unit lowers the pH of the film unit or image receiver to stabilize the image.

Internal-image silver halide emulsions useful in this invention are described more fully in the November 1976 edition of *Research Disclosure,* pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 3,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye-releasers are dispersed in an aqueous alkaline solution-permeable polymeric binder, such as gelatin, as a separate layer about 0.2 to 7 microns in thickness; and the alkaline solution-permeable polymeric interlayers, e.g, gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure,* the disclosure of which is hereby incorporated by reference.

Any material is useful as the image-receiving layer in this invention as long as the desired function of mordanting or otherwise fixing the dye images is obtained. The particular material chosen will, of course, depend upon the dye to be mordanted. Suitable materials are disclosed on pages 80 through 82 of the November 1976 edition of *Research Disclosure,* the disclosure of which is hereby incorporated by reference.

Use of a neutralizing material in the film units employed in this invention will usually increase the stability of the transferred image. Generally, the neutralizing material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure,* and pages 35 through 37 of the July 1975 edition of *Research Disclosure,* the disclosures of which are hereby incorporated by reference.

A timing or inert spacer layer can be employed in the practice of this invention over the neutralizing layer which "times" or controls the pH reduction as a function of the rate at which alkali diffuses through the inert spacer layer. Examples of such timing layers and their functioning are disclosed in the *Research Disclosure* articles mentioned in the paragraph above concerning neutralizing layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November 1976 edition of *Research Disclosure,* the disclosure of which is hereby incorporated by reference.

The alkaline solution-permeable, substantially opaque, light-reflective layer employed in certain embodiments of photographic film units used in this invention is described more fully in the November 1976 edition of *Research Disclosure,* page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone. In an alternative embodiment, the emulsions sensitive to each of the three primary regions of the spectrum can be disposed as a single segmented layer, e.g., as by the use of microvessels, as described in Whitmore U.S. patent application Ser. No. 184,714, filed Sept. 8, 1980.

The silver halide emulsions useful in this invention, both negative-working and direct-positive ones, are well known to those skilled in the art and are described in *Research Disclosure,* Volume 176, December 1978, Item No. 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that, for all practical purposes, do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Synthesis of Redox-Dye Releasing (RDR) Compound 1

Compound I

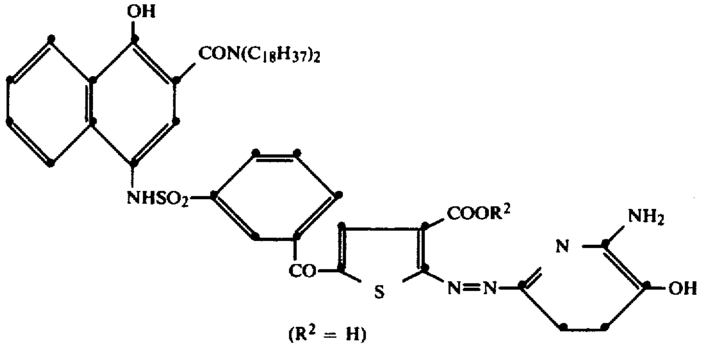

($R^2$ = H)

A. Carboxylic ester ($R^2=C_2H_5$)

AN intimate mixture of 12.9 g ethyl 2(6-amino-5-hydroxy-2-pyridylazo)-5-(m-fluorosulfonylbenzoyl)-3-thenoate (0.027 mole) and 21.2 g 4-amino-1-hydroxy-N,N-dioctadecyl-2-naphthamide (U.S. Pat. No. 4,135,929) (0.3 mole) was added to a hot (110° to 115° C.) degassed mixture of 11.3 g sodium bicarbonate in 250 ml of dimethyl sulfoxide (DMSO). The mixture was stirred for one hour at the above temperature, at which point thin-layer chromatographic (TLC) analysis (1 percent methanol in chloroform) showed that the product consisted essentially of a single component. The product mixture was stirred into a solution of 20 ml of concentrated HCl in 1200 ml of water, and the slurry was filtered to give 33 g (assay unknown) of red solid (105 percent). A 6 g sample was chromatographed on 247 g of DF-O Kieselgel using vacuum as a pressure gradient to yield 3.9 g of the product ester ($R^2=C_2H_5$) (68 percent). A small sample was recrystallized from isopropyl alcohol, melting point 153° to 155° C.

Analysis calculated for $C_{66}H_{96}O_8N_6S_2$: C, 67.99; H, 8.32; N, 7.21. Found: C, 68.18; H, 8.33; N, 6.88.

B. Carboxylic acid ($R^2=H$)

A solution of the above carboxylic ester 58.3 g (0.05 mole) and 582 ml of DMSO was degassed for one hour with argon at room temperature and treated with an argon-degassed solution of 28 g (0.425 mole) of 85 percent potassium hydroxide dissolved in 60 ml of water. The solution was stirred overnight under a blanket of argon. The solution was poured (under argon) into a solution of 36.5 g of concentrated HCl in 1200 ml of water, letting the temperature rise to 30° to 35° C. The purple solid was filtered and washed well with water, then air dried to give 49.5 g of crude solid (87 percent). Chromatography of 43 g of the crude solid (DF-O silica gel, using vacuum as a pressure gradient) gave 20 g of purified RDR, melting point 187° to 189° C. A field desorption mass spectrogram gave an m/e equal to 1137 ion as the major species in the sample.

Intermediates:

C. Ethyl 2-(6-amino-5-hydroxy-2-pyridylazo)-5-(m-fluorosulfonylbenzoyl)-3-thenoate

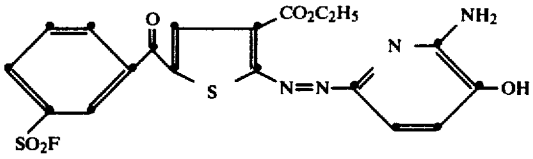

A nitrosylsulfuric acid solution was prepared by adding sodium nitrite (7.2 g, 0.104 mole) to 40 ml of 97 percent sulfuric acid at such a rate that a temperature of 70° to 80° C. was attained without generating brown fumes. The resulting solution was cooled to 10° to 15° C. and 100 ml of a 1:5 mixture of propionic and acetic acid ("1:5 acid") was added, keeping the temperature below 15° C. To the well-agitated solution 35.7 g (0.1 mole) of ethyl 2-amino-5-(m-fluorosulfonylbenzoyl)-3-thenoate was added below 5° C. over a 15-minute period. A clear diazonium solution was obtained after one hour at 0° to 5° C. Excess nitrous acid was destroyed with about 0.5 g of urea at 0° to 5° C. (30-minute stir time) and the diazo solution was added at 0° to 5° C. to a solution of 11 g (0.1 mole) of 2-amino-3-hydroxypyridine dissolved in 300 ml of 5 M ammonium acetate and 300 ml of 1:5 acid. This addition was carried out over a 30-minute period. After checking pH with Congo Red paper, the dye slurry was stirred for one hour at 0° to 5° C., drowned with 400 ml of water, and the mixture was allowed to warm to room temperature. The red solid was collected by filtration to yield 46.1 g (95 percent), 100 percent assay versus a recrystallized sample (dimethylformamide/isopropyl alcohol), melting point 170° to 172° C.

Analysis calculated for $C_{17}H_{15}FN_4O_6S_2$: C, 47.69; H, 3.17; N, 11.71. Found: C, 47.88; H, 3.32; N, 11.83.

D. Ethyl 2-amino-5-(m-fluorosulfonylbenzoyl)-3-thenoate

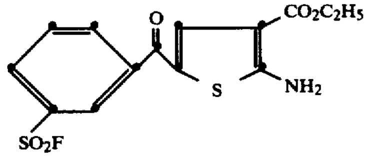

A solution of 175 g (0.33 mole) of ethyl 5-(m-fluorosulfonylbenzoyl)-2-(2,2,2-trichloroethoxycarbonylamino)-3-thenoate and 4200 ml of isopropyl alcohol was treated with 175 g of zinc dust at 75° to 77° C. over a 6-minute period. The mixture was held at gentle reflux for 50 minutes before a sudden onset of reaction, characterized by vigorous boiling of the solvent, was noticed. Heating was removed until the reaction subsided. Reflux was continued until all the urethane was consumed, as indicated by thin-layer chromatography in 30 percent acetone:70 percent hexane. The mixture was filtered hot through Celite (diatomaceous earth) and the filtrate was evaporated slowly in an evaporating dish until about one liter of solvent had been removed. The solid was collected by filtration to yield 66 g (56 percent) of yellow solid, melting point 170° to 172° C. A second crop was obtained by further evaporation (melting point 153° to 168° C.), and this was recrystallized from isopropyl alcohol to yield 14.5 g (12 percent) of yellow solid, melting point 168° to 170° C.

E. Ethyl 5-(m-fluorosulfonylbenzoyl)-2-(2,2,2-trichloroethoxycarbonylamino--)-3-thenoate

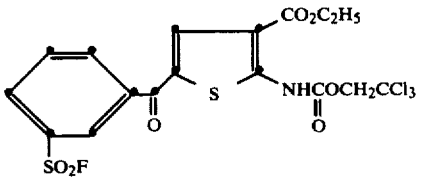

A mixture of 25 g (0.061 m) of ethyl 3-diethylamino-2-[N-(2,2,2-trichloroethoxycarbonyl)thiocarbamoyl]acrylate, 17.15 g (0.061 m) of m-fluorosulfonylphenacyl bromide, and 125 ml of isopropyl alcohol was heated to reflux for 5 minutes. The reactants dissolved at reflux, and shortly thereafter the product precipitated. The mixture was cooled and the solid collected by filtration. The solid was washed with isopropyl alcohol and then water to give 27.6 g (85 percent) of product, melting point 108° to 110° C.

Analysis calculated for $C_{17}H_{13}Cl_3FNO_7S_2$: C, 38.32; H, 2.46; N, 2.63. Found: C, 38.27; H, 2.60; N, 2.69.

F. Ethyl 3-diethylamino-2-[N-(2,2,2-trichlorethoxycarbonyl)thiocarbamoyl]acrylate

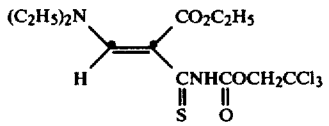

A mixture of 13.83 g (0.15 mole) potassium thiocyanate, 21.1 g (0.1 m) of 2,2,2-trichloroethyl chloroformate, and 0.2 g (0.0005 mole) of 18-crown-6 ether was stirred in 100 ml of dry toluene for 30 minutes at room temperature. The reaction mixture was heated to reflux for 10 minutes. The lachrymatory solution was filtered and 17.12 g (0.1 m) of ethyl 3-(diethylamino)acrylate was added dropwise at room temperature to the resulting solution. The solution was stirred at room temperature overnight and the resulting solid was collected by filtration, washed with petroleum ether (boiling point 30° to 60° C.), and air dried to give 30 g (74 percent) of orange solid, melting point 88° to 91° C.

Analysis calculated for $C_{13}H_{19}Cl_3N_2O_4S$: C, 38.48; H, 4.72; N, 6.91. Found: C, 38.39; H, 4.63; N, 7.02.

G. Ethyl trans-3-(diethylamino)acrylate

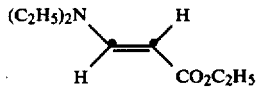

A solution of 14.6 g of diethylamine (0.2 m) in 100 ml of ethyl alcohol was added dropwise to a stirred solution of 19.6 g of ethyl propiolate (0.2 m) in 150 ml ethyl alcohol at room temperature. The exothermic reaction mixture was stirred at room temperature for 3½ hours. The solvent was removed and the residue distilled through a short Vigreux column (boiling point 88° C./6 mm) to give 29.83 g (87 percent) of ethyl 3-(diethylamino)acrylate.

EXAMPLE 2

Synthesis of RDR Compound 2

Compound 2

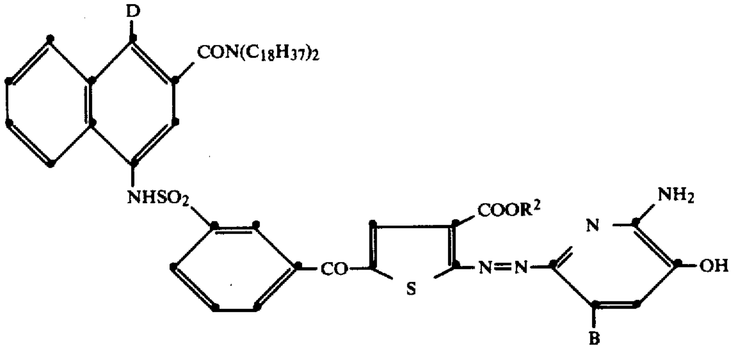

(D = OH, $R^2$ = H, B = $SO_2CH_3$)

A. Carboxylic acid ($R^2=H$, $B=SO_2CH_3$, $D=OH$)

A solution of 2.5 g of the ester-blocked compound ($D=OCOC_6H_5$, $R^2=CH_2CH_2CN$, and $B=SO_2CH_3$) in 225 ml tetrahydrofuran and 100 ml methanol was degassed with argon for one hour, 110 ml 2 N sodium hydroxide added, and the reaction was stirred for one hour. It was poured into a large excess of ice and concentrated HCl having over it a layer of ethyl acetate. The layers were separated, and the aqueous layer further extracted with ethyl acetate. The extracts were washed with cold water, dried over anhydrous magnesium sulfate and concentrated to 2.1 g of a red glass. The product was purified by ascending dry column chromatography, yielding 0.51 g of pure Compound 2.

B. Carboxylic ester ($D=OCOC_6H_5$, $R^2=CH_2CH_2CN$, $B=SO_2CH_3$)

In this reaction, the above ester-blocked compound ($D=OH$, $R^2=CH_2CH_2CN$) of the above formula was prepared by replacement of the bromo analog ($B=Br$) by a methylsulfonyl group ($B=SO_3CH_3$) on the pyridine ring. A solution of the 5-bromo compound (2.75 g) in 20 ml dimethylformamide (DMF) was treated with 2 g of a 60 percent aqueous solution of sodium methanesulfinate. After 10 minutes, the mixture was poured into a large amount of water and the precipitated product was collected by filtration.

Intermediates:

C. Bromo Compound ($D=OCOC_6H_5$, $R^2=CH_2CH_2CN$, $B=Br$)

1-Benzoyloxy-4-{3-[5-amino-4-(2-cyanoethoxycarbonyl)-2-thenoyl]benzenesulfonamido}-N,N-dioctadecyl-2-naphthamide (6.2 g, 5.3 mmol) in 120 ml of 2:5 acid (see Example 1-C) was treated with 0.74 ml (27.3 meq) of 97 percent sulfuric acid below 30° C. The mixture was cooled to 0.5° C. and a solution of 370 mg (5.36 mmoles) of sodium nitrite in 2 ml of water was added dropwise below 5° C. The diazonium solution was stirred for one hour at 0° to 5° C. and was then added below 5° C. to a solution composed of 997 mg (5.36 mmoles) of 2-amino-5-bromo-3-pyridinol in 45 ml of methanol and 15 ml of pyridine. The resulting mixture was stirred for one hour at 0° to 5° C. and then was drowned with 75 ml of water. The resulting slurry was warmed to room temperature, filtered (very fast), and the red solid was washed well with water, then dried to give 5.8 g (80 percent) of product contaminated only with minor amounts of impurities, as identified by thin-layer chromatography.

D.

1-Benzoyloxy-4-{3-[5-amino-4-(2-cyanoethoxycarbonyl)-2-thenoyl]benzenesulfonamido}-N,N-dioctadecyl-2-naphthamide This compound was prepared from 15 g of the corresponding 5-(2,2,2-trichloroethoxycarbonylamino) compound (E below), by refluxing for a half hour with 4 g of zinc in 150 ml of acetonitrile. The mixture was filtered hot and the solvent removed under reduced pressure to give 13 g of a yellow syrup. The material was purified by column chromatography on Kieselgel and eluted with chloroform. Evaporation of the solvent yielded 10.3 g (77 percent) of a crystalline solid (m/e=1172).

E.

1-(Benzoyloxy)-4-{3-[5-(2,2,2-trichloroethoxycarbonylamino)-4-(2-cyanoethoxycarbonyl)-2-thenoyl]benzenesulfonamido}-N,N-dioctadecyl-2-naphthamide A solution of 15 g of the oil prepared in F below and 6.8 g (15.7 mmol) of 2-cyanoethyl 3-diethylamino-2-[N-(2,2,2-trichloroethoxycarbonyl)thiocarbamoyl]acrylate in 150 ml of THF was refluxed for one hour. Analysis by TLC (25 percent acetone in hexane) indicated the presence of only a small amount of starting materials and one new product. The mixture was cooled, poured into water, and extracted well with chloroform. The chloroform extracts were combined, washed with water and dried ($MgSO_4$). The chloroform was removed under reduced pressure, leaving 15 g (78 percent) of a brown oil, used without purification.

F.

1-Benzoyloxy-4-(3-bromoacetylbenzenesulfonamido)-N,N-dioctadecyl-2-naphthamide

A solution of 15.7 g (15.7 mmol) of 1-benzoyloxy-4-(3-acetylbenzenesulfonamido)-N,N-dioctadecyl-2-naphthamide in 150 ml of dioxane was treated with 2.51 g (15.7 mmoles) of bromine at 40° to 45° C. The reaction was held for one hour at this temperature, during which time the bromine color discharged. Analysis by TLC (25 percent acetone in hexane) indicated a complete reaction and only one main product was observed. The solution was drowned to ice water and the resulting mixture was extracted with chloroform. The chloroform extracts were combined and washed well with water, dried ($MgSO_4$), and stripped to give 15 g (89 percent) of an oil which was used without further purification.

G.

4-(3-Acetylbenzenesulfonamido-1-benzoyloxy-N,N-dioctadecyl-2-naphthamide

A solution of 4-amino-1-benzoyloxy-N,N-dioctadecyl-2-naphthamide (15.7 mmol), and 2 ml of pyridine in 110 ml of THF was cooled to 0° to 5° C. and 3.42 g of m-chlorosulfonylacetophenone was added all at once. The solution was allowed to warm to room temperature and stirred overnight. The THF was removed under reducing pressure and the resulting solid was reslurried in water, dried and then recrystallized from heptane to give 9.32 g (58 percent) of a tan solid, melting point 91° to 93° C.

H. 2-Cyanoethyl 3-diethylamino-2-[N-(2,2,2-trichloroethoxycarbonyl)-thiocarbamoyl]acrylate A mixture of 55.4 g (0.57 moles) of potassium thiocyanate, 1 g of 18-crown-6 cyclic ether, 80.5 g (0.38 moles) of 2,2,2-trichloroethyl chloroformate and 300 ml of toluene was heated for 3 hours at 50° C. to prepare the acyl isothiocyanate. The mixture was filtered and 74 g (0.38 moles) of 2-cyanoethyl trans-3-diethylaminoacrylate were added dropwise over one hour. After 24 hours at room temperature, the mixture was filtered to give 108 g of crude material which was recrystallized from toluene to give 63 g of pure adduct, melting point 116° to 118° C.

I. 2-Cyanoethyl trans-3-diethylaminoacrylate

A solution of 48 g (0.39 moles) of 2-cyanoethyl propiolate in 100 ml of chloroform was treated with a solution of 28.5 g (0.38 moles) of diethylamine in 100 ml of chloroform. The temperature was kept at 10° to 20° C. during the addition. The chloroform was stripped off and the product used without purification.

J. 2-Cyanoethyl propiolate

A solution of 98 g of propiolic acid (1.4 moles), 99.5 g of hydracrylonitrile (1.4 moles), 2 g of p-toluenesulfonic acid and 200 ml of chloroform were refluxed, using a Soxhlet extractor filled with 3 A molecular sieves to remove the water generated during the esterification. A total reflux time of 94 hours was employed. The reaction was cooled, poured into water and extracted with chloroform. The combined extracts were washed with dilute bicarbonate solution, dried ($MgSO_4$), and concentrated to give 49.2 g (29 percent) of a liquid used without purification.

K. 4-Amino-1-benzoyloxy-N,N-dioctadecyl-2-naphthamide

A solution of 36.9 g (0.05 mole) of 4-nitro-1-hydroxy-N,N-dioctadecyl-2-naphthamide (U.S. Pat. No. 4,135,929) in 300 ml of THF and 5 ml of pyridine was treated at 0° to 5° C. with 5.8 ml (0.5 mole) of benzoyl chloride. The mixture was allowed to stir at room temperature overnight and was drowned into ice and HCl, filtered and dried to give 40.2 g of blocked material. Recrystallization from heptane gave 31.6 g of pure nitro derivative which was reduced with 0.5 g of 5 percent Pd on charcoal in 100 ml of THF at 25° to 30° C. and 40 psig. The solution was used without isolation of the amine.

L. 2-Amino-5-bromo-3-pyridinol

6-Bromooxazolo[4,5-b]pyridine-2(3H)-one (K. Rüfenacht and H. Kristinsson, Helv. Chim. Acta 59 (5), 1953 [1976]) (4.3 g; 0.02 mole) sodium hydroxide (5 g; 0.125 mole) and water (50 ml) were stirred on the steam bath for 45 minutes. The solution was cooled to approximately 10° C. and carefully acidified with concentrated HCl (considerable foaming). The resulting solid was collected by filtration, washed with water and dried. The yield was 3.0 g (79 percent) of tan solid melting at 187° to 189° C. Recrystallization from aqueous ethanol afforded 2.0 g of tan crystals, melting point 195° to 197° C.

Analysis calculated for $C_5H_5BrN_2O$: C, 37.77; H, 2.67; N, 14.82; Br, 42.27. Found: C, 37.76; H, 2.79; N, 14.87; Br, 41.94.

EXAMPLE 3

Synthesis of RDR Compound 3

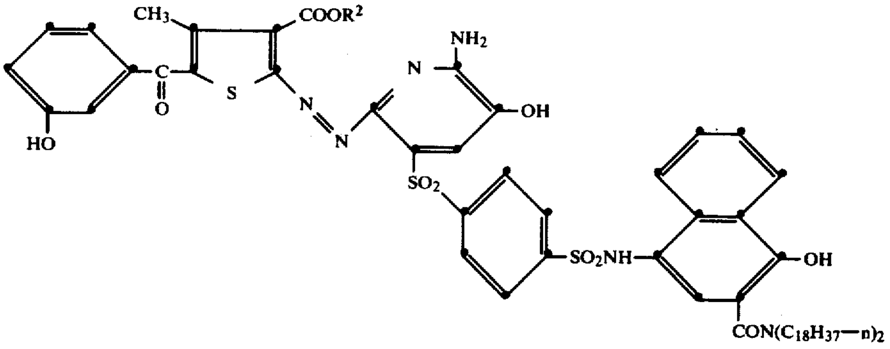

Compound 3

$R^2 = H$

A. Carboxylic ester, $R^2=C(CH_3)_3$

A solution of 6.6 g (6.8 mmol) of 4-[4-(2-cyanoethylsulfonyl)benzenesulfonamido]-1-hydroxy-N,N-dioctadecyl-2-naphthamide in 125 ml of DMF was degassed for a half hour and treated with 13.6 ml of 1 N potassium hydroxide at 5° to 10° C. The solution was warmed to 20° to 25° C. and was held for 15 minutes. The temperature was lowered to 5° to 10° C. and 12.5 ml of acetic acid was added, followed by 3.63 g (6.8 mmol) of t-butyl 2-(6-amino-3-bromo-5-hydroxy-2-pyridylazo)-5-(3-hydroxybenzoyl)-4-methyl-3-thenoate and the solution was allowed to stir for one hour. The reaction mixture was drowned in ice and dilute HCl, and the solid was collected by filtration, washed with water and air dried. The product was recrystallized from isopropyl alcohol using decolorizing charcoal to give 6.2 g (66 percent) of blue solid, melting point 107° to 109° C.

Analysis calculated for $C_{75}H_{106}N_6O_{11}S_3$: C, 66.03; H, 7.85; N, 6.12. Found: C, 65.54; H, 7.75; N, 6.62.

B. Carboxylic acid ($R^2=H$)

A solution of 6.5 g (4.76 mmol) of the above ester in 100 ml trifluoroacetic acid was stirred for 2 hours, drowned into ice and water, and the resulting solid was filtered off, washed with water and air dried to give 6.0 g of a blue solid.

Analysis calculated for $C_{71}H_{98}H_6O_{11}S_3$: C, 65.20; H, 7.57; N, 6.43. Found: C, 65.40; H, 7.65; N, 6.39.

Intermediates:

C. 4-[4-(2-cyanoethylsulfonyl)benzenesulfonamido]-1-hydroxy-N,N-dioctadecyl-2-naphthamide A solution of 4-amino-1-hydroxy-N,N-dioctadecyl-2-naphthamide (U.S. Pat. No. 4,135,929) (0.03 mol) in 450 ml of degassed pyridine was cooled to 5° to 10° C. and 8.8 g (0.03 mol) of 4-(2-cyanoethylsulfonyl)benzenesulfonyl chloride was added scoopwise at 0° to 5° C. The mixture was stirred for one hour at this temperature and was warmed to 20° to 25° C. and held for one hour. The reaction mixture was drowned in 2 liters of ice and water, filtered, reslurried in water and dried. The product was recrystallized from hexane to give 18 g (62 percent) of a tan solid, melting point 85° to 86° C.

D. t-Butyl 2-(6-amino-3-bromo-5-hydroxy-2-pyridylazo)-5-(3-hydroxybenzoyl)-4-methyl-3-thenoate A slurry of t-butyl 2-amino-5-(3-hydroxybenzoyl)-4-methyl-3-thenoate in 150 ml of 1:5 acid (see Example 1-C) was cooled to 0° to 5° C. and 9 ml of concentrated sulfuric acid was added below 5° C. A solution of 4.21 g (0.61 mole) of sodium nitrite in 10 ml of water was slowly added, holding the temperature at 0° to 5° C. during the addition. The diazonium was stirred for 1.5 hours at 0° to 5° C. and then was added below 10° C. to a solution of 11.34 g of 2-amino-5-bromo-3-pyridinol (Example 2-L) dissolved in 30 ml of pyridine and 25 ml of 2:5 acid. The mixture was stirred for 2 hours at 0° to 5° C., then poured into cold water. The resulting mixture was filtered, washed with water, air dried and recrystallized from ethyl cellosolve to give 23 g (72 percent) of a red solid, used without further purification.

E. 4-(2-Cyanoethylsulfonyl)benzenesulfonyl chloride

A solution of 3.4 g (0.162 mol) of 3-(4-aminophenylsulfonyl)propionitrile in 24 ml of water and 8 ml of concentrated HCl was cooled to 0° to 5° C. and treated with a solution of 1.12 g (0.162 mol) of sodium nitrite in 5 ml of water below 5° C. The diazonium solution was stirred for one hour and poured slowly into a slurry of 1 g of cuprous chloride in 5.5 g of $SO_2$ and 20 ml of acetic acid, keeping the temperature below 20° C. during the addition. The mixture was stirred for one hour and then was diluted with 150 ml of water. The solid was collected by filtration, washed with water and air dried to give 3.43 g (72 percent) of pure material, melting point 124° to 125° C.

F. 3-(4-Aminophenylsulfonylpropionitrile)

A mixture of 5.05 g (0.002 mol) of 4'-(-2-cyanoethylsulfonyl)acetanilide, 20 ml of ethanol, 20 ml of water, and ½ ml of concentrated sulfuric acid was heated at reflux for 7 hours. Analysis by TLC indicated a complete reaction. The solution was cooled to room temperature, and the resulting slurry was drowned into water and the mixture was neutralized with sodium bicarbonate. The product was collected by filtration, washed with water and air dried to give 3.9 g (93 percent) of white solid, melting point 152° to 153° C.

G. 4'-(2-Cyanoethylsulfonyl)acetanilide

A solution of 19.9 g (0.1 mol) of p-acetamidobenzenesulfinic acid (*Organic Synthesis*, Coll. Vol. I, page 7), 100 ml of water, 40 ml of acetic acid and 6.6 ml (0.1 mole) of acrylonitrile was heated on a steam bath for 2 hours. The resulting slurry was cooled to room temperature, filtered, washed with water and air dried to give 17.1 g (68 percent) of white solid.

H. t-Butyl 2-amino-5-(3-hydroxybenzoyl)-4-methyl-3-thenoate

To a stirred solution of t-butyl 2-benzamido-5-m-hydroxybenzoyl-4-methyl-3-thenoate (41 g, 0.085 mol) in dioxane (150 ml) was added a solution of sodium hydroxide (13.6 g, 0.34 mol) in water (30 ml). The mixture was stirred for 15 minutes, then heated to reflux for 1.5 hours, when the reaction was complete by TLC analysis. The reaction mixture was cooled and carefully acidified with concentrated hydrochloric acid. The reaction mixture was diluted with water and the product extracted with chloroform. The chloroform solution was evaporated to dryness and the residue recrystallized from acetonitrile. The pale yellow powder weighed 10.3 g (36.4 percent yield) and melted at 169° to 172° C.

I. t-Butyl 2-benzamido-5-m-hydroxybenzoyl-4-methyl-3-thenoate

A mixture of t-butyl 3-amino-2-(N-benzoylthiocarbamoyl)crotonate (32.4 g, 0.1 mol), 2-bromo-3'-hydroxyacetophenone (21.5 g, 0.1 mol), and isopropyl alcohol (200 ml) was stirred and heated to reflux. Soon after solution was effected a voluminous solid separated. After one hour, the reaction mixture was cooled and the solid was collected on a filter, washed with isopropyl alcohol and dried to yield 28.4 g (65 percent yield) of solid melting at 201° to 202° C. with decomposition.

J. t-Butyl 3-amino-2-(N-benzoylthiocarbamoyl)crotonate

A mixture of t-butyl 3-aminocrotonate (65.3 g, 0.4 mol), benzoyl isothiocyanate (62.9 g, 0.4 mol), and diethyl ether (300 ml) was stirred at ambient temperature for 3 hours. The solid product was collected on a filter, washed with ether and dried to give 56 g (43.7 percent yield) of material melting at 107° to 110° C.

EXAMPLE 4

Synthesis of Positive Redox Dye-Releasing (PRDR) Compound 4

Compound 4

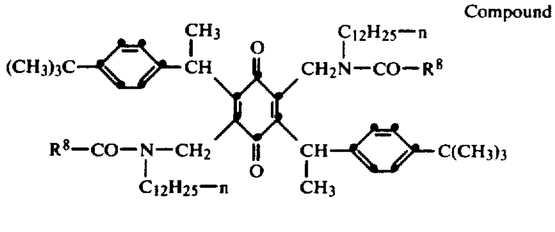

($R^8 - Q^1 - R^8$)

wherein $R^8$=:

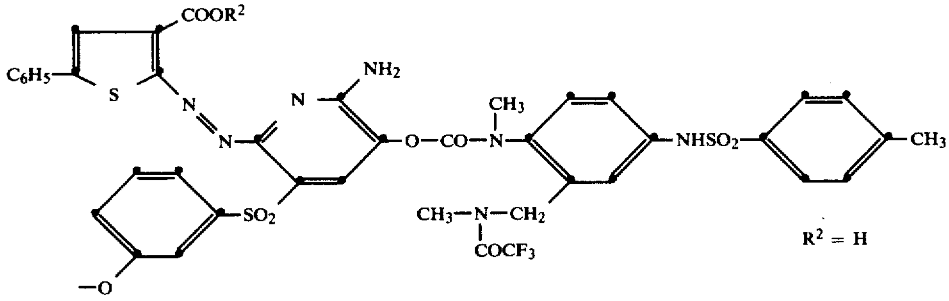

$R^2$ = H

A. Carboxylic acid ($R^2$=H)

To trifluoroacetic acid (75 ml) cooled to 3° C. was added the t-butyl ester ($R^8$—$Q^1$—$R^8$ wherein $R^2$=t-$C_4H_9$) (8.4 g; 2.93 mmoles). The solution was stirred under argon at 2° to 5° C. for 2.5 hours, allowed to warm to 20° C. and poured into cold water (800 ml). The solid was collected on a filter, washed with water and dried to yield 8.1 g of product. Purification was effected by column chromatography on Woelm silica gel eluting with 2 percent methanol in chloroform to remove nonpolar impurities, then with 5 percent methanol in chloroform to take off product. The weight of the PRDR was 5.0 g.

B. Carboxylic ester ($R^2$=t-$C_4H_9$)

To a solution of the unshifted carboxylic ester shown below in (C) (7 g; 3.53 mmoles) in dry pyridine (75 ml) was added diisopropylethylamine (3.5 ml) and N-methyl-N-[2-(N-methyltrifluoroacetamidomethyl-4-(p-toluenesulfonamido)phenyl]carbamoyl chloride (Mooberry and Archie, U.S. Ser. No. 949,462 U.S. Pat. No. 4,310,612) (5.1 g; 10.6 mmol); the mixture was stirred at ambient temperature, under argon, for one hour, then poured with vigorous mechanical stirring into ice and water (one liter) containing concentrated hydrochloric acid (90 ml). After stirring for 10 minutes, the solid product was collected, washed with water and dried. The crude material, weighing 12 g, was purified by column chromatography on Woelm silica gel, eluting first with chloroform, then one percent methanol in chloroform to remove nonpolar impurities. The main fraction, weighing 8.4 g, was eluted with 2 percent methanol in chloroform.

C. Unshifted carboxylic ester

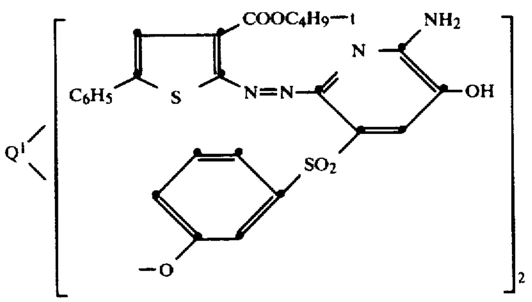

A solution of the cyanoethylsulfone intermediate ($E_1$ below) (6.49 g, 5 mmol) in DMF (75 ml) was cooled to 5° C. and tetrabutylammonium hydroxide (40 percent aqueous solution, 6.5 g; 0.01 mole) was added. After stirring at 0° to 5° C. for 30 minutes, all of it had reacted (shown by TLC). Acetic acid (5 ml) and t-butyl 2-(6-amino-3-bromo-5-hydroxy-2-pyridylazo)-5-phenyl-3-thenoate (4.75 g; 0.01 mole) were then added. The solution was stirred for 3 hours, during which time the temperature was allowed to slowly rise to room temperature, and poured with stirring into cold water (750 ml). The solid was collected on a filter, washed with water and dried to afford 10.1 g of crude product. Recrystallization from isopropyl alcohol yielded 7.5 g of pure material.

Intermediates:

D. t-Butyl 2-(6-amino-3-bromo-5-hydroxy-2-pyridylazo)-5-phenyl-3-thenoate

A solution of t-butyl 2-amino-5-phenyl-3-thenoate (8.26 g; 0.03 mole) in 2:5 acid (120 ml) (see Example 1) was chilled to −2° C. and concentrated sulfuric acid (5 ml) was added at such a rate that the temperature did not exceed 2° C.; a solution of sodium nitrite (2.16 g) in water (5 ml) was added dropwise below 2° C. The resulting diazonium solution was stirred at −2° C. to +2° C. for 45 minutes, then added in a slow stream with magnetic stirring to a cold (below 5° C.) solution of 2-amino-5-bromo-3-pyridinol (Example 2-L) (5.67 g; 0.03 mole) in pyridine (30 ml) and 2:5 acid (90 ml). The dye solution was stirred at 0° to 5° C. for 1.5 hours, then the cooling bath was removed and the mixture stirred for an additional 30 minutes. After drowning in cold water (2.5 liters), the dye was collected on a filter, washed with water and dried to yield 14.7 g of material with only traces of impurities.

E. Cyanosulfone intermediate $Q^1<[-O-m-C_6H_4SO_2CH_2CH_2CN]_2$ 2-(m-Hydroxyphenylsulfonyl)propionitrile (4.23 g; 0.02 mole) was dissolved in dry pyridine (75 ml); diisopropylethylamine (5 ml) and 2,5-bis[1-(p-t-butylphenyl)ethyl]-3,6-bis(N-chloroformyl-N-dodecylaminomethyl)benzoquinone (see U.S. Pat. No. 4,207,104, column 33) (9.48 g, 0.01 mol) were added and the resulting solution was stirred under argon at ambient temperature for 5 hours, then poured with vigorous mechanical stirring into ice (300 g) containing concentrated hydrochloric acid (100 ml). After stirring for 10 minutes, the solid was collected on a filter, washed free of acid with water and dried on the filter. The solid set to a gum with a strong pyridine odor. The gum was dissolved in chloroform (200 ml); the chloroform solution was washed with 10 percent HCl (40 ml) and twice with 50 ml portions of water, then dried over anhydrous $MgSO_4$. Evaporation of the solvent afforded 12.1 g of a glass which was recrystallized from isopropyl alcohol to give 9.38 g of pink powder, melting at 140° to 141° C.

Analysis calculated for $C_{76}H_{104}N_4O_{10}S_2$: C, 70.32; H, 8.09; N, 4.32. Found: C, 70.35; H, 7.95; N, 4.19.

F. m-Hydroxyphenylsulfonylpropionitrile

To a solution of sodium hydroxide (7 g; 0.17 mole) in water (150 ml) was added sodium-m-mesyloxybenzenesulfinate (22 g; 0.085 mole). The mixture was stirred on the steam bath for 30 minutes, until a clear solution was obtained, then cooled to 25° C. Acetic acid (20 ml) and acrylonitrile (5.6 ml; 0.088 mole) were added, and the resulting solution was stirred on the steam bath for 3 hours. On chilling in an ice bath, there was obtained a pale beige solid. Weight = 12.4 g; melting point 104.7° C. A sample was recrystallized from water to analysis, melting point 105° to 108° C.

G. Sodium m-mesyloxybenzenesulfinate

To a solution of sodium sulfite (63 g; 0.5 mole) in water (400 ml) was added m-mesyloxybenzenesulfonyl chloride (67.7 g; 0.25 mole). The mixture was stirred vigorously, adding 50 percent sodium hydroxide solution as needed to maintain pH at 7 to 7.25, holding the temperature at 20° to 25° C. by means of a cold water bath. After 2 hours, a clear solution with a small amount of brown sludge was obtained. The mixture was filtered through Celite and the filtrate was poured into an evaporating dish and slowly allowed to evaporate. The first material to separate (32.5 g) was inorganic (by I. R. Spectrum). Further evaporation afforded three crops of crystalline material which was used without further purification.

EXAMPLE 5

Synthesis of PRDR Compound 5

Compound 5

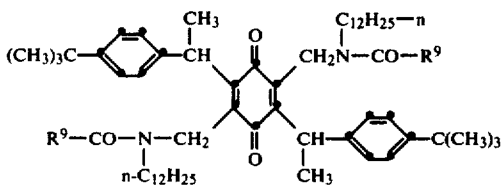

$(R^9 - Q^1 - R^9)$ wherein $R^9$ =:

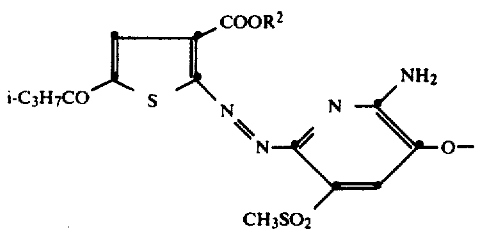

$R^2 = H$

The carboxylic acid ($R^2$ = H) was prepared from the t-butyl ester by debutylation in the presence of $CF_3COOH$ as described in Example 4-A. The t-butyl ester was obtained by reaction of the dye G-H with 2,5-bis[1-(p-t-butylphenyl)ethyl]-3,6-bis(N-chloroformyl-N-dodecylaminomethyl)benzoquinone under conditions described in Example 4-E. The dye, G-H, was prepared by the action of sodium methanesulfinate and the bromo dye, t-butyl 2-(6-amino-2-bromo-5-hydroxy-2-pyridylazo)-5-isobutyryl-3-thenoate, by a method similar to that in Example 2-B. The bromo dye was obtained from the diazotization of t-butyl 2-amino-5-isobutyryl-3-thenoate and coupling with 2-amino-5-bromo-3-pyridinol as in Example 3-D.

EXAMPLE 6

Synthesis of PRDR Compound 6

Compound 6

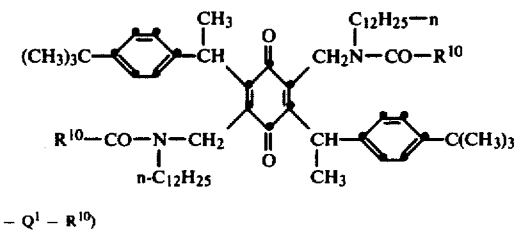

$(R^{10} - Q^1 - R^{10})$ wherein $R^{10}$ =:

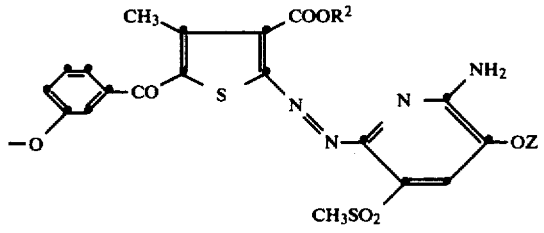

$R^2 = H$

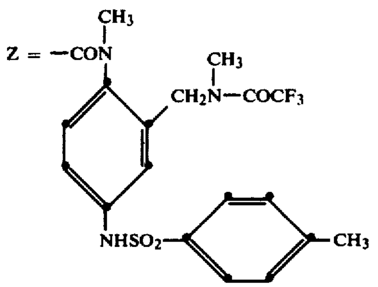

The carboxylic acid ($R^2$ = H) was prepared by debutylation of the t-butyl ester as described in Example 4-A. The t-butyl ester ($R^2 = t\text{-}C_4H_9$) was prepared by blocking the dye (Z = H) on the pyridinol oxygen in a manner similar to that described in Example 4-B. The pyridinol dye (Z = H) was obtained by replacement of the 5-bromo analog with sodium methanesulfinate by a method similar to that of Example 2-B. The bromo dye was prepared by diazotization of:

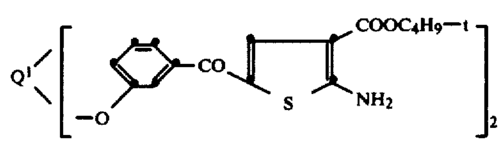

and coupling with 2-amino-5-bromo-3-pyridinol as in Example 2-C. The above aminothiophene compound was linked to the dye-releasing carrier through the m-hydroxybenzoyl group in a manner similar to Example 4-E.

EXAMPLE 7

Released Dyes-Spectra and Light Stability

A receiving element was prepared comprising a poly(ethylene terephthalate) film support having thereon a nickel sulfate hexahydrate (0.58 g/m$^2$)/gelatin (1.08 g/m$^2$) metal complexing layer, and a poly(4-vinylpyridine)/gelatin mordant layer (each at 2.15 g/m$^2$).

The receiving element was immersed in an alkaline solution of the azo dyes listed in Table II. The receiver was removed from the dye solution, washed in distilled water, placed in a pH 7.0 buffer solution and dried. The λ-max at maximum density, along with the "half band-width" (HBW), the wavelength range of the curve at half the maximum density, are recorded in the Table below.

A narrow HBW generally designates a purer hue. However, many of the dyes of this invention owe a fairly wide HBW to a shoulder on the long wavelength side. The advantageous feature of this class of dyes is the sharper cutoff on the short wavelength side and less unwanted absorption below 600 nm. Because the long wavelength shoulder extends beyond 700 nm, it is out of the visible region and does not affect the visual perception of the color.

The light stability was measured in most cases by exposing the above film strip to a Xenon Arc fading apparatus using Test Method 16E-1978 (40 AATCC fading units) described in the Technical Manual of the American Association of Textile Chemists and Colorists, Volume 55 (1979), using blue wool standards. $D_o$ is the original density, and $D_f$ is the final density.

TABLE II

Nickel-Complexed Thienylazopyridinol Dyes

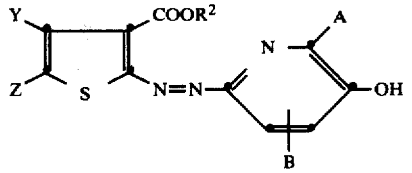

| Dye | $R^2$ | Y | Z | A | B | Hue of Ni Complex λ-max (nm) | Hue of Ni Complex HBW (nm) | Light Stability $D_o$ | Light Stability $D_f$ | Light Stability % Fade |
|---|---|---|---|---|---|---|---|---|---|---|
| A | H | H | $NH_2SO_2$—m-$C_6H_4$—CO— | $NH_2$ | H | 644 | 119 | 1.74 | 1.72 | 3.0 |
| A[1] | $(CH_2)_2CN$ | H | $NH_2SO_2$—m-$C_6H_4$—CO— | $NH_2$ | H | — | — | — | — | — |
| B | H | H | $NH_2SO_2$—m-$C_6H_4$—CO— | $NH_2$ | 4-$CH_3$ | 648 | 117 | 1.43 | 1.34 | 6.0 |
| C | $(CH_2)_2CN$* | $CH_3$ | $NH_2SO_2$—m-$C_6H_4$—CO— | $NH_2$ | 5-$SO_2NHC_3H_7$—i | 665 | 135 | 0.35 | 0.33 | 7.0 |
| D | $(CH_2)_2CN$* | $CH_3$ | $NH_2SO_2$—m-$C_6H_4CO$— | $NH_2$ | 5-$SO_2CH_3$ | 661 | 131 | 0.72 | 0.69 | 4.0 |
| E | $(CH_2)_2CN$* | $CH_3$ | $NH_2SO_2$—m-$C_6H_4CO$— | $NH_2$ | 5-$SO_2C_6H_5$ | 667 | 127 | 0.54 | 0.51 | 6.0 |
| F | H | H | $NH_2SO_2$—m-$C_6H_4CO$— | $NH_2$ | 5-$SO_2NHC_3H_7$—i | 660 | 124 | ** | — | — |
| G | H | H | $NH_2SO_2$—p-$C_6H_4$—CO— | $NH_2$ | 5-$SO_2NHC_3H_7$—i | 658 | 124 | 0.74 | 0.70 | 5.0 |
| G[1] | $CH_3$ | H | $NH_2SO_2$—p-$C_6H_4$—CO— | $NH_2$ | 5-$SO_2NHC_3H_7$—i | — | — | — | — | — |
| H | H | H | $NH_2SO_2$—p-$C_6H_4CO$— | $NH_2$ | 5-$SO_2CH_3$ | 654 | 120 | 0.90 | 0.86 | 4.0 |
| H[1] | $CH_3$ | H | $NH_2SO_2$—p-$C_6H_4CO$— | $NH_2$ | 5-$SO_2CH_3$ | — | — | — | — | — |
| I | H | $CH_3$ | HO—m-$C_6H_4CO$— | $NH_2$ | 5-$SO_2NHC_3H_7$—i | 660 | 131 | 0.55 | 0.53 | 4.0 |
| J | H | H | HO—m-$C_6H_4CO$— | $NH_2$ | 5-$SO_2NHC_3H_7$—i | 660 | 124 | ** | — | — |
| K | H | $CH_3$ | HO—m-$C_6H_4CO$— | $NH_2$ | 5-$SO_2CH_3$ | 654 | 125 | 0.71 | 0.68 | 4.0 |
| L | H | $CH_3$ | HO—m-$C_6H_4CO$— | $NH_2$ | 5-$SO_2$—p-$C_6H_4SO_2NH_2$ | 656 | 114 | 1.17 | 1.12 | 5.0 |
| M | $(CH_2)_2CN$* | H | HO—m-$C_6H_4CO$— | $NH_2$ | 5-$SO_2$—m-$C_6H_4SO_2NH_2$ | ** | — | ** | — | — |
| N | $(CH_2)_2CN$* | H | HO—m-$C_6H_4CO$— | $NH_2$ | 5-$SO_2C_6H_5$ | ** | — | ** | — | — |
| O | H | H | HO—m-$C_6H_4CO$— | $NH_2$ | H | ** | — | ** | — | — |
| P | H | $CH_3$ | HO—o-$C_6H_4CO$— | $NH_2$ | 5-$SO_2NHC_3H_7$—i | 671 | 131 | 0.55 | 0.53 | 4.0 |
| Q | H | H | HO—o-$C_6H_4CO$— | $NH_2$ | 5-$SO_2CH_3$ | 667 | 128 | 0.81 | 0.79 | 2.5 |
| R | H | H | $C_6H_5CO$— | $NH_2$ | 5-$SO_2NHC_3H_7$—i | 664 | 128 | 0.63 | 0.60 | 5.0 |
| S | H | H | $C_6H_5CO$— | $NH_2$ | 5-$SO_2CH_3$ | 660 | 128 | 1.09 | 1.05 | 4.0 |
| T | H | H | $C_6H_5CO$— | $NH_2$ | 5-$SO_2$—m-$C_6H_4SO_2NH_2$ | ** | — | ** | — | — |
| U | H | $CH_3$ | $C_6H_5CO$— | $NH_2$ | 5-$SO_2$—m-$C_6H_4SO_2NH_2$ | 652 | 116 | 1.32 | 1.23 | 7.0 |
| V | H | H | $C_6H_5CO$— | $NH_2$ | 5-$SO_2C_6H_5$ | 663 | 127 | 1.23 | 1.17 | 5.0 |
| W | H | $CH_3$ | $C_6H_5CO$— | $NH_2$ | 5-$SO_2C_6H_5$ | 655 | 125 | 1.30 | 1.27 | 2.0 |
| X | H | H | $C_6H_5CO$— | OH | 5-$SO_2$—$C_7H_7$—p | 666 | 115 | ** | — | — |
| Y | H | H | $(CH_3)_2CHCO$— | $NH_2$ | 5-$SO_2CH_3$ | 650 | 122 | 0.74 | 0.72 | 3.0 |
| Z | H | H | $C_6H_5$— | $NH_2$ | 5-$SO_2NHC_3H_7$—i | 652 | 117 | 0.92 | 0.84 | 9.0 |
| AA | H | H | $C_6H_5$— | $NH_2$ | 5-$SO_2$—m-$C_6H_4SO_2NH_2$ | 656 | 105 | 1.07 | 1.04 | 3.0 |
| BB | H | H | $C_6H_5$— | $NH_2$ | 5-$SO_2$—m-$C_6H_4$—OH | 666 | 113 | 1.11 | 1.08 | 2.0 |
| CC | H | H | $NH_2SO_2$—p-$C_6H_4$— | $NH_2$ | 5-$SO_2$—m-$C_6H_4SO_2NH_2$ | ** | — | 1.12 | 1.02 | 9.0 |
| DD | H | benzo | | $NH_2$ | 5-$SO_2$—p-$C_6H_4$—$SO_2NH_2$ | 652 | 126 | 0.45 | 0.44 | 3.0 |
| EE | H | benzo | | $NH_2$ | 5-$SO_2$—m-$C_6H_4OH$ | 641 | 119 | 0.79 | 0.75 | 2.0 |

TABLE II-continued

Nickel-Complexed Thienylazopyridinol Dyes

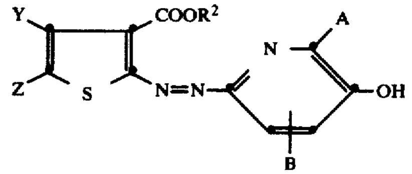

| | | | | | | Hue of Ni Complex | | Light Stability | | |
|---|---|---|---|---|---|---|---|---|---|---|
| Dye | $R^2$ | Y | Z | A | B | λ-max (nm) | HBW (nm) | $D_o$ | $D_f$ | % Fade |
| FF | H | H | $CH_3SO_2$— | $NH_2$ | 5-$SO_2$—p-$C_6H_4$—$SO_2NH_2$ | 642 | 108 | 0.51 | 0.49 | 4.0 |

*The spectrum is presumed to be the free carboxy dye which is readily generated under alkaline conditions.
**Comparative data not available.

EXAMPLE 8

Comparative Tests

Dye J of Example 7 was compared with three dyes to distinguish them over dyes of the prior art of companion patent applications. Control Dye (a) is an o-carboxyphenylazo analogue of Chapman and Reczek, U.S. Ser. No. 174,406, filed Aug. 1, 1980, now U.S. Pat. No. 4,287,292. Control Dye (b) is a 2-hydroxy-4-nitrophenylazo cyan dye similar to the released dye from Compound 11 in U.S. Pat. No. 4,142,891 of Baigrie et al. Control Dye (c) is a 2-carboxy-4-nitrophenylazo analogue of (b) (cf. Chapman and Reczek, loc. cit.).

The transmission spectra of the four nickel dyechelates were obtained in the manner of Example 7. The curves were normalized by computer to a maximum density of 1.0.

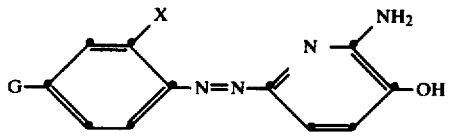

Control Dye (a), X=COOH, G=H
Control Dye (b), X=OH, G=$NO_2$
Control Dye (c), X=COOH, G=$NO_2$

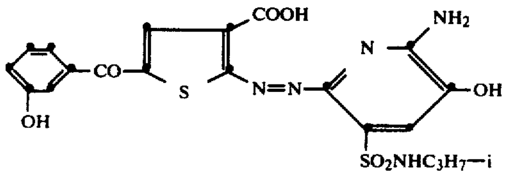

Dye J

Control Dye a, the phenyl analogue of the thienyl dyes of the invention, was magenta in hue and entirely out of the spectral range of the present invention. It had a λ-max of 560. The addition of a nitro group, Dye c, was insufficient to shift the dye bathochromically to a cyan; its color was blue with a λ-max at 620 nm. Dye b had a λ-max of 670, but had much higher unwanted absorption in the 400 to 600 nm range than Dye J. Dye J had a λ-max of 660 and had the best cyan hue of those tested.

The invention has been described in detail with particular reference to preferred embodiments thereof, but it will be understood that variations and modifications can be effected within the spirit and scope of the invention.

What is claimed is:

1. A photographic element comprising a support having thereon a coordination complex of a polyvalent metal ion and a compound having the formula:

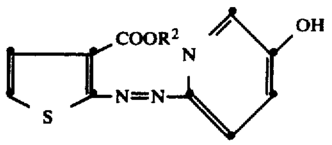

wherein $R^2$ is hydrogen, alkyl or substituted alkyl, such that $COOR^2$ is a hydrolyzable moiety.

2. The photographic element of claim 1 wherein $R^2$ represents hydrogen and the pyridine ring has an amino group in the 2-position.

3. The photographic element of claim 1 wherein the metal ion is nickel (II), copper (II), zinc (II), platinum (II), palladium (II) or cobalt (II).

4. A coordination complex of a polyvalent metal ion and a compound having the formula:

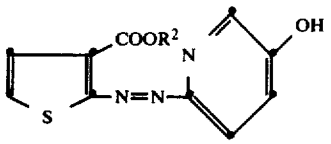

wherein $R^2$ is hydrogen, alkyl or substituted alkyl, such that $COOR^2$ is a hydrolyzable moiety.

5. The coordination complex of claim 4 wherein $R^2$ represents hydrogen, and the pyridine ring has an amino group in the 2-position.

6. The coordination complex of claim 4 wherein the metal ion is nickel (II), copper (II), zinc (II), platinum (II), palladium (II) or cobalt (II).

* * * * *